United States Patent [19]

Kim et al.

[11] Patent Number: 5,200,682
[45] Date of Patent: Apr. 6, 1993

[54] MOTOR CURRENT PHASE DELAY COMPENSATING METHOD AND APPARATUS THEREOF

[75] Inventors: Dong-Il Kim, Seoul; Hyo-Kyu Kim; Sang-Kwon Im, both of Suwon-shi, all of Rep. of Korea

[73] Assignee: Samsung Electronics Co., Ltd., Suwon, Rep. of Korea

[21] Appl. No.: 744,900

[22] Filed: Aug. 14, 1991

[30] Foreign Application Priority Data

Aug. 14, 1990 [KR] Rep. of Korea ............... 90-12550

[51] Int. Cl.$^5$ ............................................. H02P 5/40
[52] U.S. Cl. ................................. 318/632; 318/800; 318/806; 318/809
[58] Field of Search ............... 318/175, 632, 254, 138, 318/798-822, 722-723

[56] References Cited

U.S. PATENT DOCUMENTS

| | | | |
|---|---|---|---|
| 4,096,422 | 6/1978 | Fleming et al. | 318/454 |
| 4,358,726 | 11/1982 | Iwakane et al. | 318/806 X |
| 4,361,794 | 11/1982 | Kawada et al. | 318/800 |
| 4,562,396 | 12/1985 | Espelage et al. | 318/809 |
| 4,575,667 | 3/1986 | Kurakake | 318/811 X |
| 4,680,525 | 7/1987 | Kobari et al. | 318/806 X |
| 4,818,927 | 4/1989 | Hino et al. | 318/798 |

FOREIGN PATENT DOCUMENTS 62-55398 3/1987 Japan .

*Primary Examiner*—Paul Ip
*Attorney, Agent, or Firm*—Burns, Doane, Swecker & Mathis

[57] ABSTRACT

This invention relates to a motor current phase delay compensating method and apparatus thereof enabling the driven system to efficiently operate by compensating current phase delay of the stator coil winding such that an alternating current servo motor for driving a FA system, a CNC, or a robot for industry generates maximum torque. An output signal of an A/D converter and a rotational direction discriminating signal of an alternating current servo motor are received whereby a phase delay value with respect to the speed is generated. The phase delay value and an output signal from the A/D converter are summed whereby a phase delay compensation amount is computed to compensate the phase delay amount. The phase delay compensation amount and an output from the speed PI controller are respectively received whereby U-phase and V-phase analog current reference instruction values area generated. The U-phase and V-phase analog current reference instruction values are summed and then inverted whereby a W-phase analog current reference instruction value is generated and thereby current delay flowing to the stator coil winding is properly compensated.

8 Claims, 6 Drawing Sheets

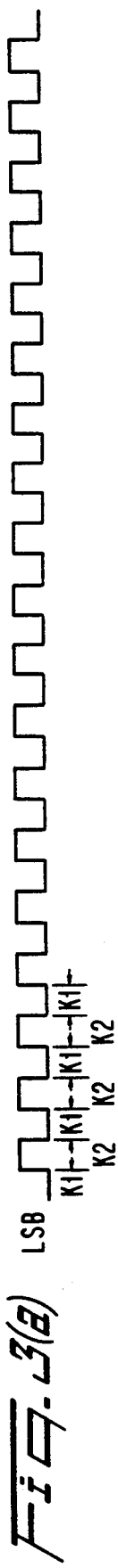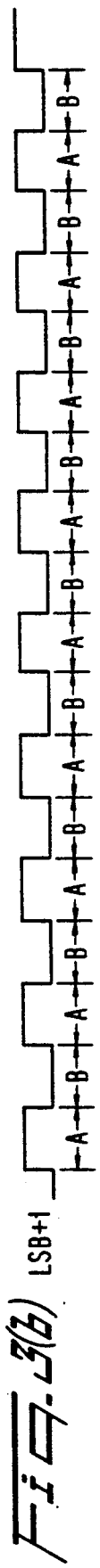
Fig. 3(a) LSB
Fig. 3(b) LSB+1
Fig. 3(c) LSB+4
Fig. 3(d) DIR

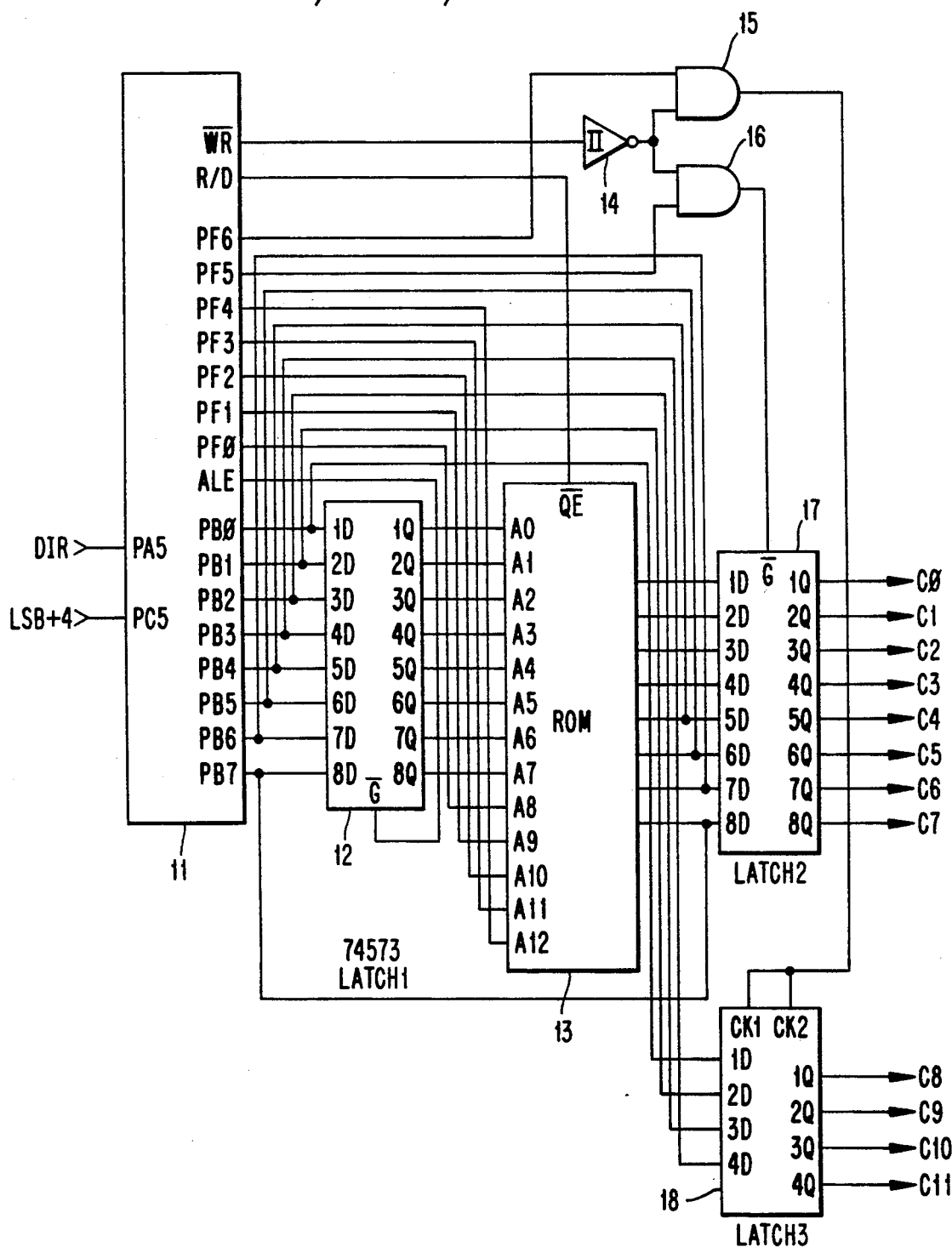

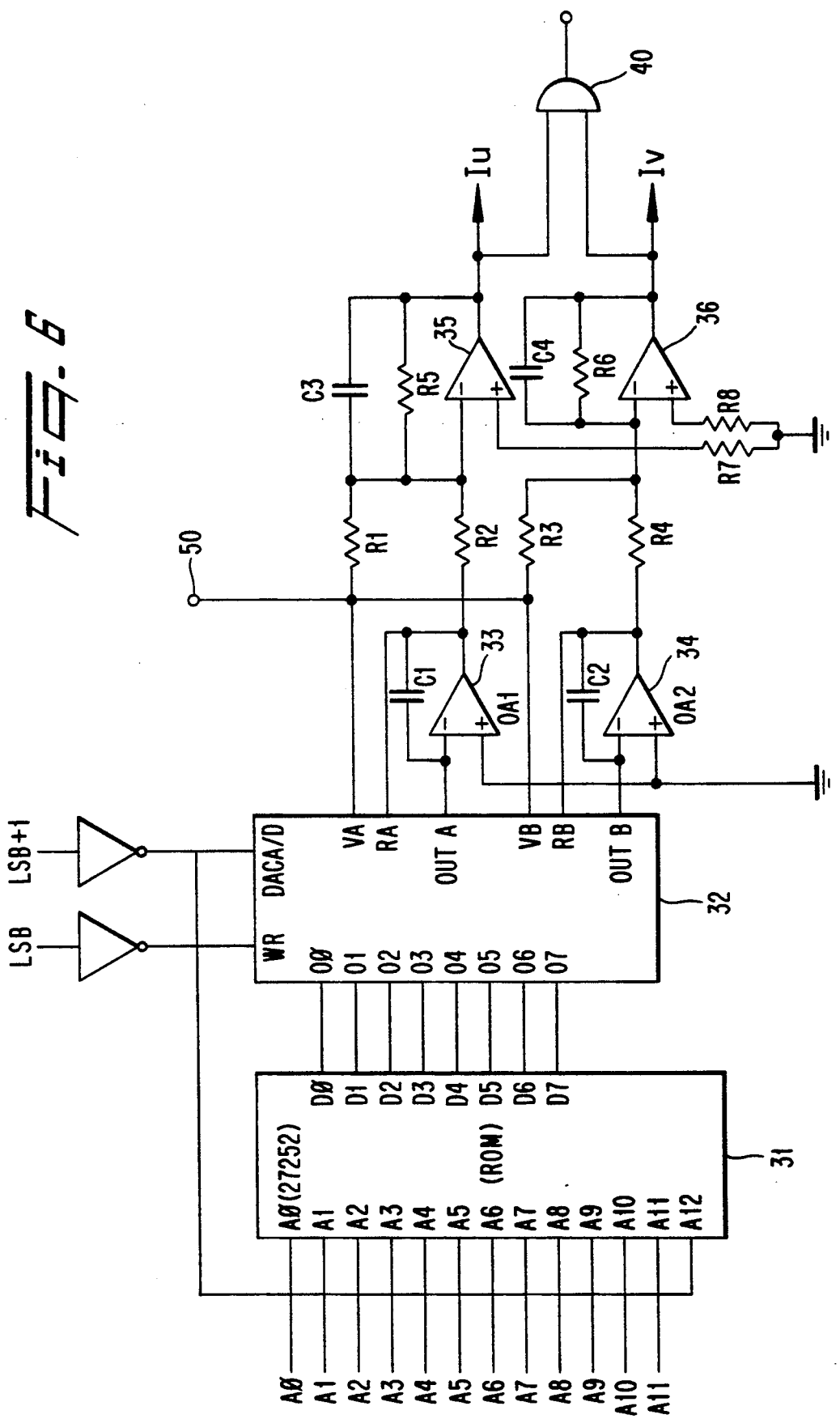

MOTOR CURRENT PHASE DELAY COMPENSATING METHOD AND APPARATUS THEREOF

TECHNICAL FIELD

The present invention relates to a motor current phase delay compensating method and apparatus thereof for a motor in which the current phase delay of the stator coil winding is compensated for so that an alternating current servo motor for driving a robot for FA system, CNC industrial purpose and the like generates maximum torque and thereby the system to be driven can be efficiently operated.

BACKGROUND ART

In general, in order to maintain high capacity operation of an alternating current servo motor, either the voltage or the current of the stator of an alternating current motor should be controlled. In the case of driving an alternating current servo motor, the position of the rotor is detected by using a position sensor such as a resolver or an encoder, and a stator current instruction value should be generated by utilizing said detected positional information so that the magnetic flux of the stator generated by three (3) phase stator current and the magnetic flux of the permanent magnet rotor are mutually operated whereby maximum torque is generated. On the other hand, since the stator coil winding of an alternating current servo motor includes a resistance element and an inductance element, current practically flowing to the stator coil winding comes to have a phase delay represented by a function of rotor speed as shown by the following expression (I) with respect to the current instruction value. And, since the bandwidth of the current control loop is limited by the magnitude of direct current supplied to inverter consisting of a power transistor, IGBT and MOSFET, the current flowing to the stator coil winding comes to have a phase delay which varies in response to the rotor speed with respect to the direct current instruction value. Therefore, the stator coil winding current of an alternating current servo motor Iu, Iv, Iw are given by the following formula (I), $$\begin{bmatrix} iu \\ iv \\ iw \end{bmatrix} = \begin{bmatrix} Im \sin(\theta r - \phi) \\ Im \sin(\theta r - \phi + 120°) \\ Im \sin(\theta r - \phi + 240°) \end{bmatrix} \quad (I)$$

wherein, $$Im = \frac{Vm - \phi m Wr}{\sqrt{R^2 + Wr^2 (L\phi - M)}}$$

$$\phi = \tan^{-1} \frac{Wr(L\phi - M)}{Rs}$$

Wherein, Vm represents a maximum value of stator phase voltage, $L\phi$ is self-inductance of each of the stator coil windings, $\phi m$ is the magnetomotive force of the permanent magnet, M is the mutual inductance between stator coil windings, Wr is the angular velocity of the rotor, $\Theta r$ is the angular displacement amount of the motor, and Rs is the resistance value of the stator coil winding.

A conventional control device of an induction motor is illustrated in Japanese patent official publication No. Sho-62-55398. However, in such a control device of an induction motor the reference value of the primary current for feeding to the induction motor is computed as an instantaneous value including a slipping on the basis of both commanding values, a torque commanding value and a magnetic flux commanding value, a mutual inductance value between the primary coil winding and the secondary coil winding of the induction motor and a magnetic flux commanding value and each set value of the induction motor, so that a frequency converting device for feeding primary current to the induction motor on the basis of said reference value is controlled. The control device includes means for obtaining a secondary magnetic flux from a respective output value of the primary voltage and the primary current of the induction motor, means for obtaining a secondary magnetic flux from the torque commanding value and the magnetic commanding value, and means for correcting the set value of the secondary coil winding resistance so that both secondary magnetic fluxes are equal, and then rendering the set value of the secondary coil winding resistance to follow its real value. This conventional device provides advantages in that torque corresponding linearly to torque command can be generated, magnetic flux response to the magnetic flux command becomes correct and speed control characteristics become better, however, there are also the disadvantages that this structure is relatively complicated and manufacturing cost is high.

As another example of a conventional apparatus, there is an analog motor current phase delay compensating apparatus shown in FIG. 1.

As shown in FIG. 1, this conventional current phase delay compensating apparatus is comprised of: a multiplier 1 for multiplying a proportional integral (PI) control output signal of a speed control gear with a resolver output signal, neither of which are shown; a phase compensating amount generator 2 for generating a phase amount to compensate by receiving an angular velocity of the rotor of the motor which is not shown; synchronous detection controller 3 for executing synchronous detection by receiving a output signal of said phase compensating amount generator 2; a circuit 4 for synchronously detecting by receiving an output signal from said multiplier 1 and synchronous detection controller 3; and a low bandpass filter 5 which receives an output signal of said synchronous detecting circuitry 4 and outputs U-phase and V-phase current instructions.

However, the conventional analog phase compensating apparatus of FIG. 1 has the drawbacks that not only is the configuration of the circuit complicated but also the phase delaying amount according to the stator coil winding current cannot sufficiently be compensated. Further, in the case of controlling various types of alternating current servo motors by means of one type of driving means, correction of the circuit is required in order to adjust the compensating amount for every respective type of alternating current servo motor.

OBJECTS AND SUMMARY OF THE INVENTION

Therefore, an object of the present invention is to overcome such various problems, and it is an object of the present invention to provide a motor current phase delay compensating method and apparatus thereof in which not only is the configuration of the circuit simple and provide the flexibility to be applied to various types of alternating current servo motors, but also current practically flowing to the stator coil winding is made to be accorded with a current command value and thereby the current phase delay amount of the stator coil winding is sufficiently compensated s that the alternating current servo motor always generates maximum torque.

In order to achieve the above-described objects, exemplary embodiments disclose a motor current phase delay compensating apparatus comprising a speed detecting means for detecting a speed of the rotor, an A/D converter for converting an analog signal of the resolver outputted from said speed detecting means into a digital signal, and a rotational direction discriminating means for discriminating the rotational direction of the servo motor; the motor current phase delay compensating apparatus according to the present invention is characterized by comprising: a phase delay compensation value generating means which receives an output signal of said A/D converter and an output signal of the rotational direction discriminating means whereby a phase delay value is generated with respect to the speed, a summing means for phase delay compensation which sums the output signal of said phase delay compensation value generating means and the output signal of the A/D converter whereby phase delay compensation amount is computed, a current reference instruction value generating means which receives the output from said phase delay compensation summing means and the output from a speed PI controller whereby U-phase and V-phase analog current reference instruction values are generated, and a W-phase current instruction value generating means which sums said U-phase and V-phase analog current reference instruction values whereby a W-phase analog reference instruction value is generated so as to control the current phase delay flowing to the stator coil winding of the motor.

And, a motor current phase delay compensating method according to exemplary embodiments of the present invention comprises the steps of: receiving an output signal LSB+4 of the A/D converter and the rotational direction discrimination signal DIR of the alternating current servo motor whereby a phase delay value for speed is generated, summing said phase delay value and the output signal from the A/D converter whereby a compensation amount for compensating the phase delay compensation amount and speed PI controller whereby analog current reference instruction values of U-phase and V-phase are generated and sums said analog current reference instruction values of U-phase and V-phase and then inverts them and thereby generates an analog current reference instruction value of W-phase to thereby compensate the current phase delay flowing to the stator coil winding.

BRIEF DESCRIPTION OF THE DRAWINGS

The above and further more specific features of the invention will be better understood from a consideration of the following detailed description according to a preferred embodiment of the invention, taken with accompanying drawings, wherein both the description and drawings are intended to be illustrative of the present invention rather than limitive thereof.

FIGS. 3(a)-3(d) are flow charts for illustrating a port selecting relation of the control signal and the D/A converter according to the present invention.

FIG. 4 is a circuit diagram of a phase delay compensating value generating means applied to the present invention.

FIG. 6 is a circuit diagram of a current reference instruction value generating means which generates the current reference instruction value applied to the present invention.

DETAILED DESCRIPTION OF THE PREFERRED EMBODIMENT

Figure 2:
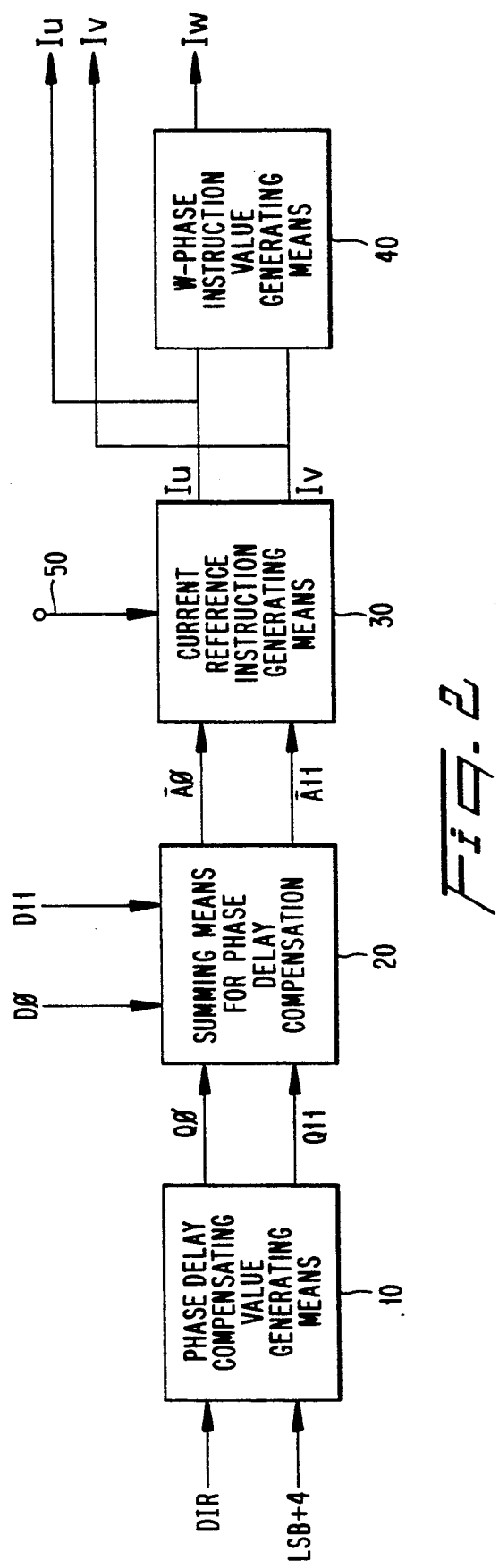
FIG. 2 is a schematic block diagram of a current phase delay compensating circuit according to the present invention.

In FIG. 2, reference numeral 10 designates a phase delay compensating value generating means for generating a phase delay compensating value with respect to the speed of the motor from the formula (I) or experimental result by receiving, from counter port P5 and input port PA5 of microprocessor 11, a rotational direction discriminating signal DIR for discriminating a rotation counterclockwise CCW or clockwise CW of servo motor and LSB+4 shown in FIG. 3(c) among 12 bits of parallel data of an A/D converter (resolver/digital converter which is not shown. Summing means 20 provide phase delay compensation which compensates the compensating amount of phase delay by receiving output signals Q0–Q11 of said phase delay compensating value generating means and receiving output signals D0–D11 from the A/D converter and for summing these and compensating. Current reference instruction generating means 30 receives respectively outputs A0–A11 from said summing means 20 for phase delay compensation and an output from speed PI controller (not shown) and for generating the current reference instruction value W-phase instruction value generating means 40 generates the W-phase current Iw by utilizing U and V phase current Iu and Iv generated by said current reference instruction value generating means 30.

Next, FIG. 4 illustrates an exemplary circuit diagram of a phase delay compensation value generating means 10 applied to the present invention, and which executes functions for detecting a rotor speed from the output of the A/D converter which converts an analog output of the resolver into a digital value, computes a phase delay amount in accordance with the rotor speed and converts this into an absolute position digital value with respect to the rotor reference point and thereafter outputs the result to the phase delay summing means 20. As shown in FIG. 4, the phase delay compensation value generating means comprises microprocessor II, latch 12 which takes ports PB0–PB7 of said microprocessor 11 as address lines and ports PF0–PF6 as data lines and executes mode selection requiring among these lines, and first ROM 13 which is connected to said latch 12 and stores an execution program of said microprocessor 11. The phase delay compensation value generating means further comprises an inverter 14 which inverts a LOW level (hereinafter called as L level) signal from the outport port WR of said microprocessor 11 into a HIGH level (hereinafter called as H level) signal, first and second AND gates 15 and 16 which, in the case where an output of said inverter 14 is H level and the signal from output port PF6 of microprocessor 11 or output port PF5 is H level, logically multiplies these signals whereby the outputs of these AND gates are, respectively, H level signals. A second latch 17 is provided which, in the case where an output of said second AND gate 16 is H level, holds the output signals 1D–8D from the first ROM 13 and outputs stored phase compensation signals Q0–Q7 to the summing circuit. A third latch 18 is provided which, in case where an output of said first AND gate 15 is H level, holds data outputted from output ports PB0–PB3 of microprocessor 11 and then inputs to input ports 1D–4D whereby stored phase compensation signals Q8–Q11 are output to the summing circuit.

Figure 5:
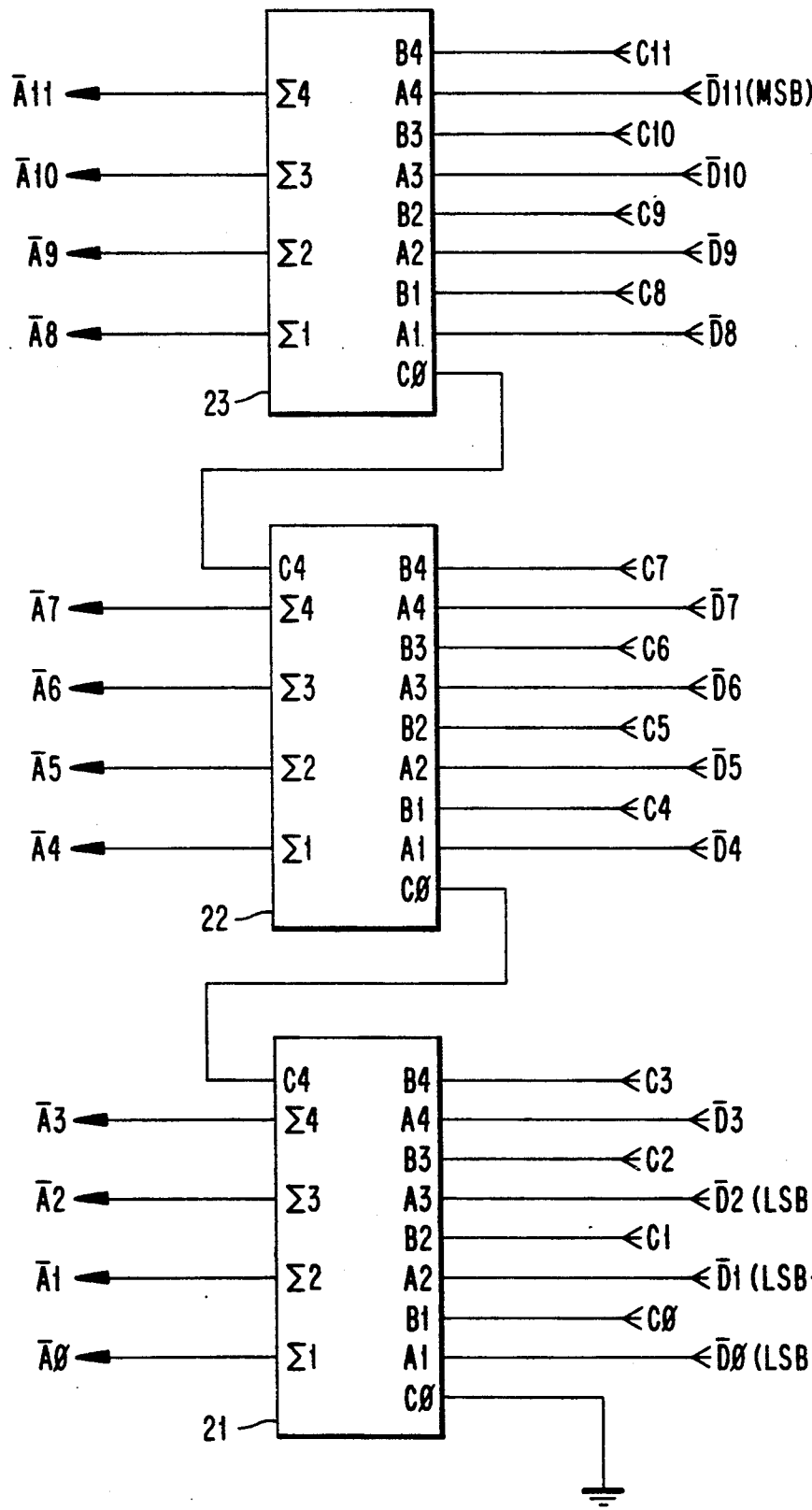
FIG. 5 is a circuit diagram of summing means for phase delay compensation which compensates the current phase delay applied to the present invention.

FIG. 5 illustrates an exemplary circuit diagram of a summing means suitable for use as phase delay compensation means 20 which compensates current phase delay applied to the present invention, which generates an absolute digital position value of the rotor with respect to the reference point by using the A/D converter to convert the analog output of the resolver and generate a current instruction value by using this digital value, and sums thereto a value which converted the current phase delay value according to a speed generated in case of applying to motor into an absolute digital position value with respect to the reference value. That is, the phase compensation values Q0–Q11 outputted from the first and second latches 17,18 of the phase delay compensation value generating means 10 and the output signals D0–D11 of the A/D converter are summed at three summing circuits 21, 22, and 23. By way of example, the summed values of the output signals D1–D4 of the A/D converter and the phase compensation values Q1–Q4, could be illustrated as:

|    | C4 | C3 | C2 | C1 |   | 0 | 1 | 0 | 1 |
|----|----|----|----|----|---|---|---|---|---|
|    | C4 | D3 | D2 | D1 |   | 1 | 1 | 0 | 1 |
| C4 | E4 | E3 | E2 | E1 | 1 | 0 | 0 | 1 | 0 | and is computed by binary addition wherein C4 is the carry.

FIG. 6 illustrates an exemplary circuit diagram of the current reference instruction value generating means 30 for generating the current reference instruction value applied to the present invention, which is comprised of: second ROM 31 which receives the absolute digital position value of the rotor compensated with current phase delay according to the speed, that is, output signals A0–A11 of the summing means 20 for phase delay compensation and LSB+1 signal of the waveform shown in FIG. 3(b) which are used as address signals and thereby outputs a reference instruction digital value of the stator coil winding current of the alternating current servo motor; D/A converter 32 which converts output signals from output ports D0–D7 of said second ROM 31 into analog current reference instruction values, the LSB signal shown in FIG. 3(a) is inputted to the WR terminal and LSB+1 signal of waveform shown in FIG. 3(b) is inputted to DAC A/D terminal; first and second operational amplifiers 33,34 in which output signals of output ports OUT A and OUT B of said D/A converter 32 are respectively inputted to inversion terminals(−) so as to generate a stator current instruction value; and third and fourth operational amplifiers 35,36 in which speed output of the speed PI controller is connected to output ports VA,VB of said D/A converter 32 so as to compensate in the case when disturbance occurs or the speed instruction value is varied whereby it is logically multiplied with the current reference instruction digital value inputted from the second ROM 31. Then it is summed with an output current of said first and second operational amplifiers 33,34 whereby U-phase stator current instruction value Iu and V-phase stator current instruction value Iv are amplified. Wherein, R1–R6 are gain resistors of the third and fourth operational amplifiers 35,36. C1 and C2 are capacitors for phase compensation of the amplifiers themselves in the case where first and second operational amplifiers 33,34 are high speed amplifiers. C3 and C4 are capacitors for eliminating ripples of third and fourth operational amplifiers 35,36. Non-inversion terminals of the first and second operational amplifiers 33,34 are grounded, and third and fourth operational amplifiers 35,36 are grounded respectively via offset bias resistors R7,R8.

Figure 1:
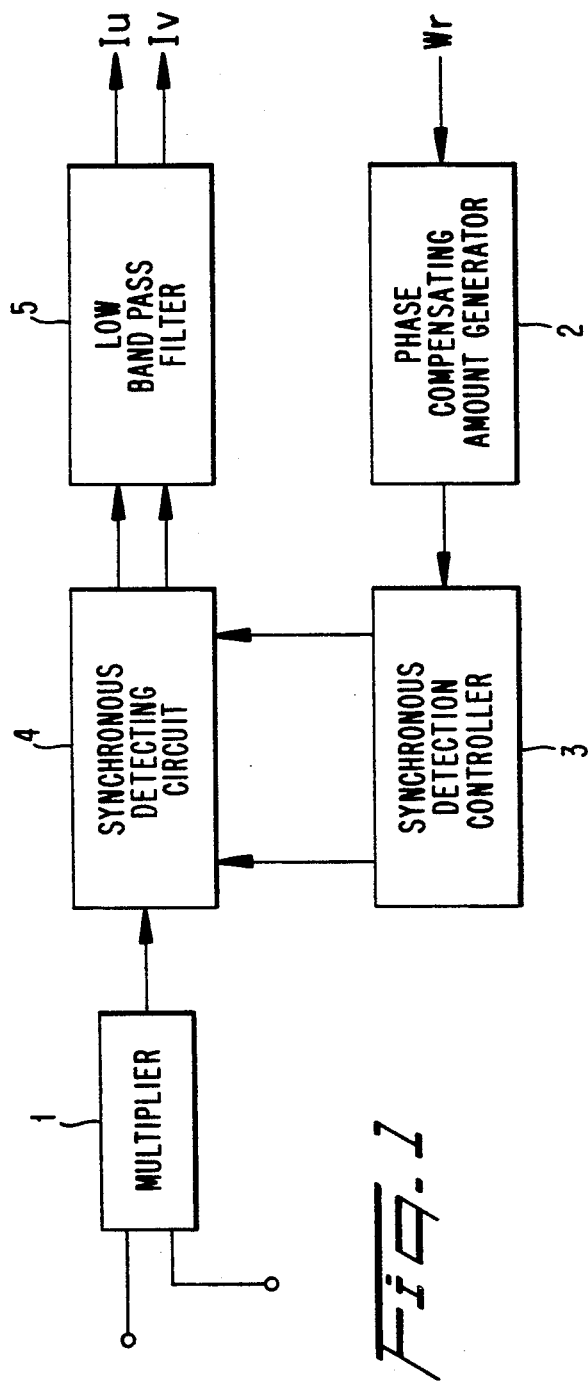
FIG. 1 is a block diagram of a conventional current phase delay compensating circuit of a motor.
Figure 7:
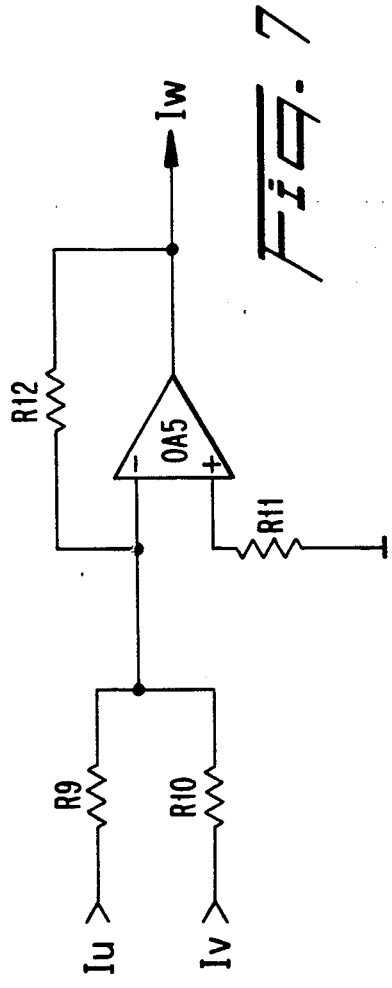
FIG. 7 is a circuit diagram of a W-phase current instruction value applied to the present invention.

FIG. 7 illustrates an exemplary circuit diagram of a W-phase current instruction value generating means 40 applied to the present invention, which comprises: summing resistors R9, R10 which sums U-phase stator current instruction value Iu and V-phase stator current instruction value Iv on the basis of expression of $Iu+Iv+Iw=0$, grounded offset bias resistor R11, fifth operational amplifier 41 which has as an input the value that said U-phase and V-phase stator current instruction values Iu, Iv are summed to at the inversion terminal(−) which amplifies and outputs W-phase stator current instruction value Iw, and gain resistor R12.

Operation as a whole with regard to a preferred embodiment of the thus constructed present invention will be described in detail hereinafter.

According to the current phase delaying method of an alternating current servo motor according to the present invention, in order to operate the alternating current servo motor always at maximum torque, a rotor digital position value (12 bits) of the motor outputted from the A/D converter and a current phase delay compensation digital position value (12 bits) outputted from the phase delay compensation value generating means 10 are summed at summing means 20 for phase delay compensation. Next, a rotor absolute digital position value compensated with current phase delay is output from said summing means 20 for phase delay compensation and is used to address the second ROM 31 of current reference instruction value generating means 30. As shown in FIG. 6, the stator current instruction Iu, Iv with respect to the U-phase and V-phase of alternating current servo motor can be generated at second ROM 31 of the current reference instruction value generating means 30 and the multiplying D/A converter 32. One full rotation of the alternating current servo motor is divided into 4096 sections for this and they are represented as parallel data of 12 bits, and the LSB+1 signal of the parallel data is inverted and thereafter inputted to the input port A12 of the second ROM 31 of the current reference instruction value generating means 30 and to the input port (DAC A/D) of the D/A converter 32. The LSB signal (refer to FIG. 3(a)) of parallel data is inverted and it is inputted to the input port of the D/A converter 32. Here, the LSB+1 signal and inverted LSB signal are control signals for controlling the second ROM 31 and D/A converter 32. Data of sin Θr for $0 \leq \Theta \leq 360°$ are stored addresses 0–4096 of the second ROM 30 and used for generation of the reference instruction value Iu of U-phase stator current, and data of $\sin(\Theta r+120°)$ for $0 \leq \Theta \leq 360°$ are stored in addresses 4097–8192 and used for generation of the reference instruction value Iv of V-phase stator current.

Accordingly, in the case when the LSB+1 signal is H level, when 8 bits parallel data corresponding to sin Θr are output from second ROM 31, data corresponding to sin θr are output to output ports VA,RA and OUT A of D/A converter 32 to thereby become the current instruction value Iu of U-phase stator of the alternating servo motor, and in the case when LSB+1 signal is L level, data corresponding to sin(Θ+120°) are output from second ROM 31, it is outputted to output ports VB,RB and OUT B of D/A converter 32 to thereby become the current instruction value Iu of the U-phase stator. Current instruction value Iw of the W-phase stator of the alternating current servo motor is obtained when the U-phase and V-phase current instruction values Iu and Iv are summed and inverted in accordance with the expression Iv+Iu=−Iw. And, in the present invention, an output of speed PI controller of speed control loop is inputted and multiplied with parallel data of the current instruction value obtained from the second ROM 31 to thereby execute control of speed. FIGS. 3(a) and (b) are a waveform chart showing the relationship of output ports of LBS signal, LSB+1 signal and D/A converter 32. As will be seen from FIG. 3(a), A ports (for example, VA,RA and OUT A) of D/A converter 32 are selected in K1 section while B ports (e.g., VB,RB and OUT B) of D/A converter 32 are selected in K2 section. And, as will be seen from FIG. 3(b), the current instruction value Iu of the U-phase stator is outputted in the section, while the current instruction value Iv of the V-phase stator is selected in the B section.

In a case where the A/D converter is used as a position sensor, while microprocessor 11 is used as the present invention, compensation of stator current phase delay is executed every 5 ms, at this moment, speed information is detected by reading in the LSB+4 signal (refer to FIG. 3(c)) among 12 bits of parallel data outputs of the A/D converter at counter port PC 5 within microprocessor 11. Direction discriminating signal DIR (Refer to FIG. 3(d)) with respect to the rotation counterclockwise CCW or clockwise CW of alternating current servo motor is inputted to input port PA5 of microprocessor 11 and the phase delay compensation value with respect to speed detection, obtained from expression (I) or experiment forces the output port ALE of microprocessor 11 to the L level at every sampling period, whereby the output ports PB0–PB7 are designated to the data line to thereby output from first and second latches 17 and 18. At this moment, said first and second latches 17 and 18 are made to hold the present phase delay compensation data until before next sampling period is started by using output ports PF5, PF6. The sampling period for executing the current phase delay compensation of stator coil winding of alternating current servo motor may also be changed with its period in accordance with the intention of a designer, and at this moment, a suitable bit among the parallel data bits of the position sensor inputted to counter port PC5 of microprocessor 11 should only be selected.

In the above description, it is explained by exemplifying in relation to that, when the speed of the rotor is detected by the resolver, its analog output signal is A/D converted and then outputted to the phase delay compensation value generating circuit to thereby convert the computed phase delay amount according to the rotor speed to an absolute position digital value with respect to the rotor reference point. However, the present invention is not limited to this, and it may of course also be, for example, that the rotor speed of motor is detected by an encoder and its output is A/D converted whereby it is received at the phase delay compensation value generating means to thereby compensate the phase delay amount.

And, in the above description, it is described for an example that the U-phase and V-phase analog reference instruction values ar first determined and then these U-phase and V-phase analog reference instruction values are summed to thereby calculate a W-phase analog reference instruction value at the W-phase current instruction generating means. However, the present invention is not limited to this, and it may also be, for example, that any two reference instruction values among U-phase, V-phase and W-phase analog reference instruction values are determined and then these are summed, whereby the remaining analog reference instruction value is then calculated.

As described above, according to the motor current phase delay compensating method and apparatus thereof according to the present invention, there is the beneficial effect that a phase delay compensation system according to the speed of alternating current servo motor is constructed by microprocessor, summer, ROM, and D/A converter, so that, simply via the correction of software, phase delay of stator of coil winding current in accordance with the rotor speed of motor can be readily compensated with regard to the capacity, resistance of stator coil winding, and magnitude of inductance of the alternating current servo motor, and magnitude of inverter feeding direct current power supply.

At any rate, various changes may be made in said current phase delay compensating method of motor without departing from the spirit and scope of the invention as defined in the appended claims.

We claim:

1. A motor current phase delay compensating apparatus comprising:
    a speed detecting means for detecting the speed of a rotor;
    an A/D converter for converting an analog signal of a resolver outputted from said speed detecting means into a digital signal;
    a rotational direction discriminating means for discriminating a rotational direction of a servo motor;
    a phase delay compensation value generating means which receives an output signal of said A/D converter and an output signal of said rotational direction discriminating means and outputs a phase delay value with respect to the speed of the rotor;
    a summing means for phase delay compensation which sums the output signal of said phase delay compensation value generating means and the output signal of the A/D converter and outputs a phase delay compensation amount;
    a current reference instruction value generating means which receives the output from said summing means for phase delay compensation and an output from a speed PI controller and outputs U-phase and V-phase analog reference instruction values; and
    a W-phase current reference instruction value generating means which sums said U-phase and V-phase analog current reference instruction values and outputs a W-phase analog reference instruction value so as to control the current phase delay slowing to a stator coil winding of motor.

2. A motor current phase delay compensating apparatus according to claim 9, wherein said phase delay compensation value generating means comprises:

a first latch means for executing mode selection required among an address line and a data line of a microprocessor;

a first ROM means which is connected to said first latch means and stores an execution program of said microprocessor;

an inverter means for inverting a signal of LOW level outputted from an output port of said microprocessor into a HIGH level signal;

first and second AND gates for logically multiplying the output signal from said inverter means and output signals from the microprocessor and outputting a result;

a second latch means which holds an output signal from said first ROM means when the output of said second AND gate is HIGH level and outputs phase compensation signals that have been stored to the summing means; and a third latch means which holds an output signal from said microprocessor when the output of said first AND gate is HIGH level and outputs phase compensation signals that have been stored to the summing means.

3. A motor current phase delay compensating apparatus according to claim 1, wherein said current reference instruction value generating means comprises:

a second ROM means which receives an absolute digital position value of rotor compensated with the current phase delay according to the speed and uses this value as an address signal to output a reference instruction digital value of a stator coil winding current of the alternating current servo motor;

a D/A converter means for converting the digital output signal of said second ROM means into an analog current reference instruction value;

first and second operational amplifiers for generating a stator current instruction value; and third and fourth operational amplifiers in which an output signal of the speed PI controller is connected to an output port of said A/D converter and is logically multiplied with the current reference instruction digital value inputted from said second ROM means and which product is then summed together with the output current instruction value of said first and second operational amplifiers, whereby a U-phase stator current instruction value Iu and a V-phase stator current instruction valve Iv are amplified.

4. A motor current phase delay compensating method comprising the steps of:

receiving an output signal LSB+4 of an A/D converter and a rotational direction discriminating signal DIR of an alternating current servo motor and generating a phase delay value with respect to speed;

summing said phase delay value and an output signal from the A/D converter and computing a phase delay compensation amount used to compensate the phase delay value;

generating U-phase and V-phase analog current reference instruction values based on said phase delay compensation amount and an output from a speed PI controller; and summing said U-phase and V-phase analog current reference instruction values and then inverting the sum to generate a W-phase analog current reference instruction value and thereby a current phase delay flowing to stator coil winding is compensated.

5. The motor current phase delay compensating method according to claim 4, wherein said phase delay value is generated at a phase delay compensation value generating means by receiving the output signal of the A/D converter and rotational direction discriminating signal of the alternating current servo motor.

6. The motor current phase delay compensating method according to claim 4, wherein said phase delay compensation amount is summed with an output signal of a phase delay compensation value generating means and an output signal from the A/D converter at a summing means for phase delay compensation.

7. The motor current phase delay compensating method according to claim 4, wherein said U-phase and V-phase analog current reference instruction values are generated by a current reference instruction value generating means by receiving an output signal of phase delay compensation amount and an output signal from a speed PI controller.

8. The motor current phase delay compensating method according to claim 4 or 7, wherein said W-phase analog current reference instruction value is generated by summing and then inverting said U-phase and V-phase analog reference instruction values by a W-phase current instruction generating means.

* * * * *